(12) United States Patent
Reed et al.

(10) Patent No.: US 8,801,899 B1
(45) Date of Patent: Aug. 12, 2014

(54) PAPERBOARDS HAVING IMPROVED BENDING STIFFNESS AND METHOD FOR MAKING SAME

(71) Applicant: International Paper Company, Memphis, TN (US)

(72) Inventors: David V. Reed, Cincinnati, OH (US); David A Dyer, Mason, OH (US)

(73) Assignee: International Paper Company, Memphis, TN (US)

( * ) Notice: Subject to any disclaimer, the term of this patent is extended or adjusted under 35 U.S.C. 154(b) by 0 days.

(21) Appl. No.: 14/020,288

(22) Filed: Sep. 6, 2013

(51) Int. Cl.
*D21F 11/00* (2006.01)

(52) U.S. Cl.
USPC .......................................................... 162/123

(58) Field of Classification Search
USPC .................. 162/123, 124–127, 129–137, 158
See application file for complete search history.

(56) References Cited

U.S. PATENT DOCUMENTS

| | | | |
|---|---|---|---|
| 6,022,450 | A | 2/2000 | Van Kessel et al. |
| 6,068,732 | A | 5/2000 | Cassidy et al. |
| 6,221,212 | B1 | 4/2001 | Sjostrom |
| 6,379,497 | B1 | 4/2002 | Sandstrom et al. |
| 6,497,790 | B2 | 12/2002 | Mohan et al. |
| 6,537,680 | B1 | 3/2003 | Norlander et al. |
| 6,802,938 | B2 | 10/2004 | Mohan et al. |
| 6,833,055 | B2 | 12/2004 | Hanson et al. |
| 6,846,529 | B2 | 1/2005 | Mohan et al. |
| 6,919,111 | B2 | 7/2005 | Swoboda et al. |
| 7,335,279 | B2 | 2/2008 | Mohan et al. |
| 7,387,702 | B2 | 6/2008 | Norlander |
| 7,682,486 | B2 | 3/2010 | Mohan et al. |
| 7,740,740 | B2 | 6/2010 | Mohan et al. |
| 7,749,583 | B2 | 7/2010 | Fugitt et al. |
| 7,897,011 | B2 | 3/2011 | Peng et al. |
| 7,943,011 | B2 | 5/2011 | Reed et al. |
| 8,388,808 | B2 | 3/2013 | Heijnesson-Hulten et al. |
| 8,460,512 | B2 | 6/2013 | Swerin et al. |
| 2004/0170749 | A1 | 9/2004 | Neivandt et al. |
| 2006/0016569 | A1 | 1/2006 | Morin et al. |
| 2008/0060774 | A1* | 3/2008 | Zuraw et al. ................. 162/135 |
| 2009/0020247 | A1* | 1/2009 | Swerin et al. ................. 162/124 |

FOREIGN PATENT DOCUMENTS

| | | |
|---|---|---|
| WO | 2011055759 | 2/2012 |
| WO | 2012051175 | 4/2012 |

OTHER PUBLICATIONS

Bending resistance (stiffness) of paper (Taber-type tester in 0 to 10 Taber stiffness unit configuration), TAPPI, T566 om-08, 2008.
Bending Stiffness of Paper and Paperboard; Found at cnr.ncsu.edu/wpsanalytical/documents/54BendingStiffness.doc.
Morphology of Pulp Fiber From Hardwoods and Influence on Paper Strength, Research Paper FPL 312; Forest Products Laboratory; Forest Service; United States Department of Agriculture; Madison, Wisonsin 53705; 1978.
Wood Pulp in Nonwovens; pp. 327-331; TAPPI proceddings 1991 Nonwoven Conference.
Internal Bond Strength (Scott type), TAPPI, T569 om-09, 2009.
G. A. Smook, Handbook for Pulp and Paper Technologists (2nd Edition, 1992), p. 342, Table 22-11.
G. A. Smook, Handbook for Pulp and Paper Technologists (2nd Edition, 1992), pp. 273-278.

* cited by examiner

*Primary Examiner* — Mark Halpern
(74) *Attorney, Agent, or Firm* — Thomas W. Ryan, III; Eric W. Guttag

(57) ABSTRACT

Paperboards having improved MD and CD bending stiffness by including a paperboard binder coalescing agent to cause starch paperboard binder to coat at least some of the paperboard fibers. Also a method for preparing these improved bending stiffness paperboards by combining with an untreated paperboard fiber stream a treated paperboard fiber stream where at least some/at least a portion of the paperboard fibers are coated with a starch paperboard binder due to the coalescing action of a paperboard binder coalescing agent.

31 Claims, 4 Drawing Sheets

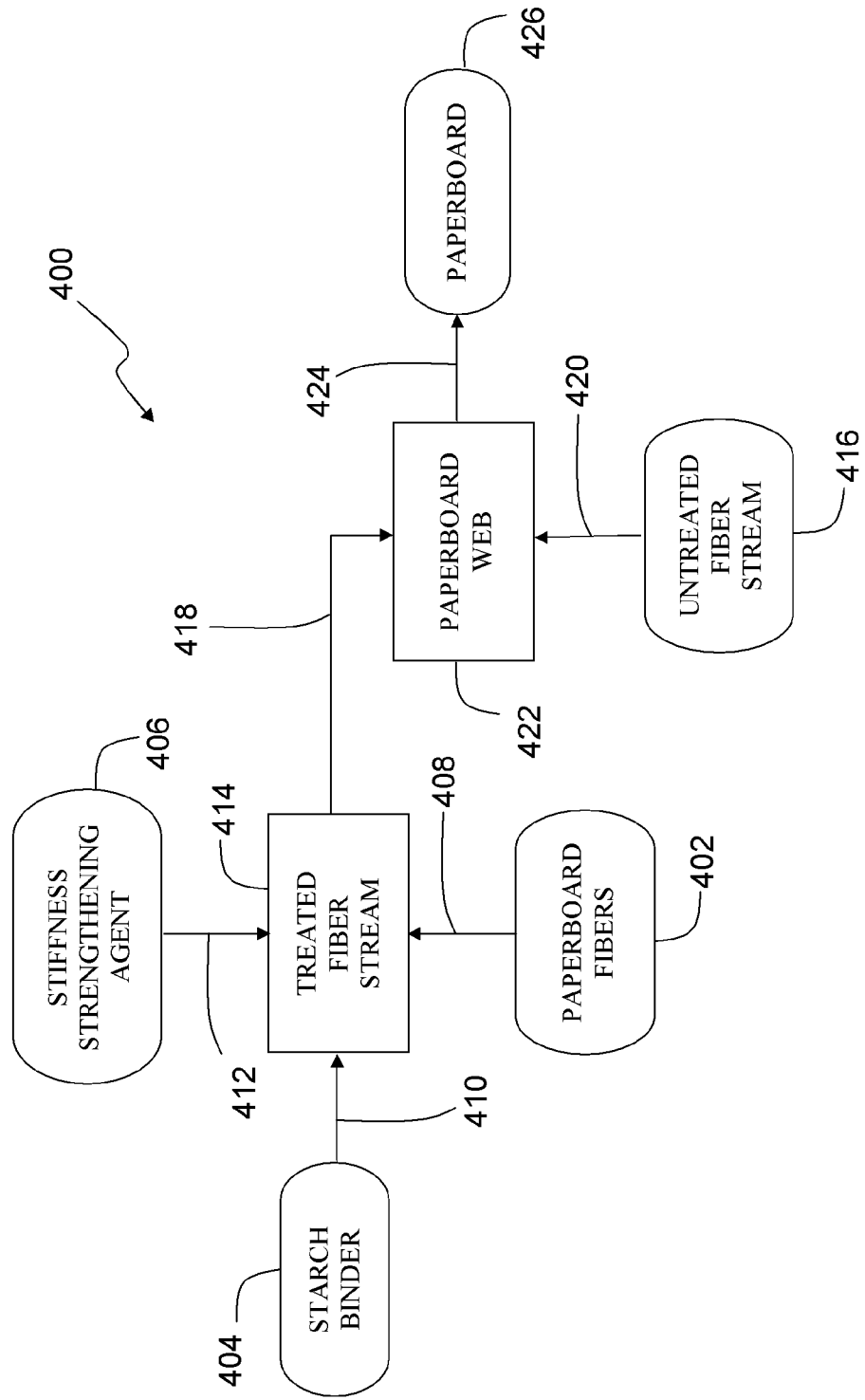

PAPERBOARDS HAVING IMPROVED BENDING STIFFNESS AND METHOD FOR MAKING SAME

FIELD OF THE INVENTION

The present invention broadly relates to hardwood fiber-containing paperboards having improved bending stiffness. The present invention also broadly relates to a method for preparing such improved bending stiffness hardwood fiber-containing paperboards by combining with an untreated hardwood-containing paper fiber stream a treated hardwood-containing paperboard fiber stream wherein at least some/at least a portion of the hardwood-containing paperboard fibers are coated with a starch paperboard binder due to the coalescing action of a paperboard binder coalescing agent.

BACKGROUND

An important attribute of paperboard used as packaging material is its stiffness. High bending stiffness may be desirable in many paperboard packaging applications. For example, bending stiffness is important in folding box container paperboards because the utility of the box depends upon its resistance to bulging when filled. The higher the bending stiffness of the paperboard, the more rigid will be the box made from that paperboard, and thus the greater the resistance of that box against loading or crushing forces.

The ability of paperboard to resist bending during the manufacture of packaging, such as boxes, may also be important. Paperboard is often bent in converting and packaging machines. The paperboard may be bent over rolls of such machines, and thus formed to certain curvatures. If, for example, the roll diameter of the packaging machine is small, the paperboard may be highly curved, thus imparting high tensile stresses on the convex side of the paperboard, and high compression stresses on the concave side. If these stresses become too high, the paperboard may be damaged by fractures and wrinkles on the surfaces thereof, as well as reducing the bending stiffness of the paperboard.

In addition, fold-crack resistance may be important for paperboards (untreated or treated with, for example, pigment coatings, fluorochemical treatments for grease resistance, moisture barrier coatings, heat sealing coatings, extrusion coatings, etc.) which are folded to form the packaging by influencing the functionality and appearance of the packaging made from the paperboard. Cracking at the fold of the packaging may lead to strength reduction, as well as the appearance of a visible crack at the folded surface of the packaging. In fact, bending stiffness and fold cracking are related, with a higher bending stiffness leading to a higher risk of fold cracking.

SUMMARY

According to a first broad aspect of the present invention, there is provided an article comprising a ply of paperboard comprising:
  paperboard fibers which comprise at least about 50% by weight hardwood fibers;
  a paperboard binder, and
  a paperboard binder coalescing agent in an amount sufficient to cause the starch paperboard binder to coat at least a portion of the paperboard fibers;
  the paperboard having:
    a caliper of from about 8 to about 28 points; and
    a basis weight in the range of from about 105 to about 300 lbs/3000 ft$^2$;
    a MD bending stiffness equal to or greater than a first curve defined by the equation:

$$y^1 = 0.5297 x^{2.2095},$$

wherein x is the caliper of the paperboard and $y^1$ is the MD bending stiffness in Taber Stiffness Units; and
    a CD bending stiffness equal to or greater than a second curve defined by the equation:

$$y^2 = 0.2188 x^{2.2681},$$

wherein x is the caliper of the paperboard and $y^2$ is the CD bending stiffness in Taber Stiffness Units.

According to a second broad aspect of the present invention, there is provided a method for preparing a paperboard, which comprises the following steps:
  (a) providing a first stream of treated paperboard fibers comprising:
    untreated paperboard fibers comprising at least about 80% by weight untreated hardwood fibers;
    a starch paperboard binder in a weight ratio of starch paperboard binder to untreated paperboard fibers of from about 0.1:1 to about 2:1; and
    a paperboard binder coalescing agent in an amount sufficient to cause the starch paperboard binder to coat at least some of the untreated paperboard fibers to provide treated paperboard fibers;
  (b) combining the first treated paperboard fiber stream of step (a) with a second untreated paperboard fiber stream comprising at least about 50% by weight untreated hardwood fibers in a weight ratio of treated paperboard fibers to combined treated and untreated paperboard fibers in the range of from about 15 to about 50 lbs/ton to provide a treated paperboard web; and
  (c) forming the treated paperboard web of step (b) into paperboard having:
    a caliper of from about 8 to about 28 points;
    a basis weight in the range of from about 105 to about 300 lbs/3000 ft$^2$;
    a MD bending stiffness equal to or greater than a first curve defined by the equation:

$$y^1 = 0.5297 x^{2.2095},$$

wherein x is the caliper of the paperboard and $y^1$ is the MD bending stiffness in Taber Stiffness Units; and
    a CD bending stiffness equal to or greater than a second curve defined by the equation:

$$y^2 = 0.2188 x^{2.2681},$$

wherein x is the caliper of the paperboard and $y^2$ is the CD bending stiffness in Taber Stiffness Units.

BRIEF DESCRIPTION OF THE DRAWINGS

The invention will be described in conjunction with the accompanying drawings, in which:

FIG. 4 is a flowchart to illustrate an embodiment of a method for preparing improved bending stiffness paperboards according to the present invention.

DETAILED DESCRIPTION

Figure 1:
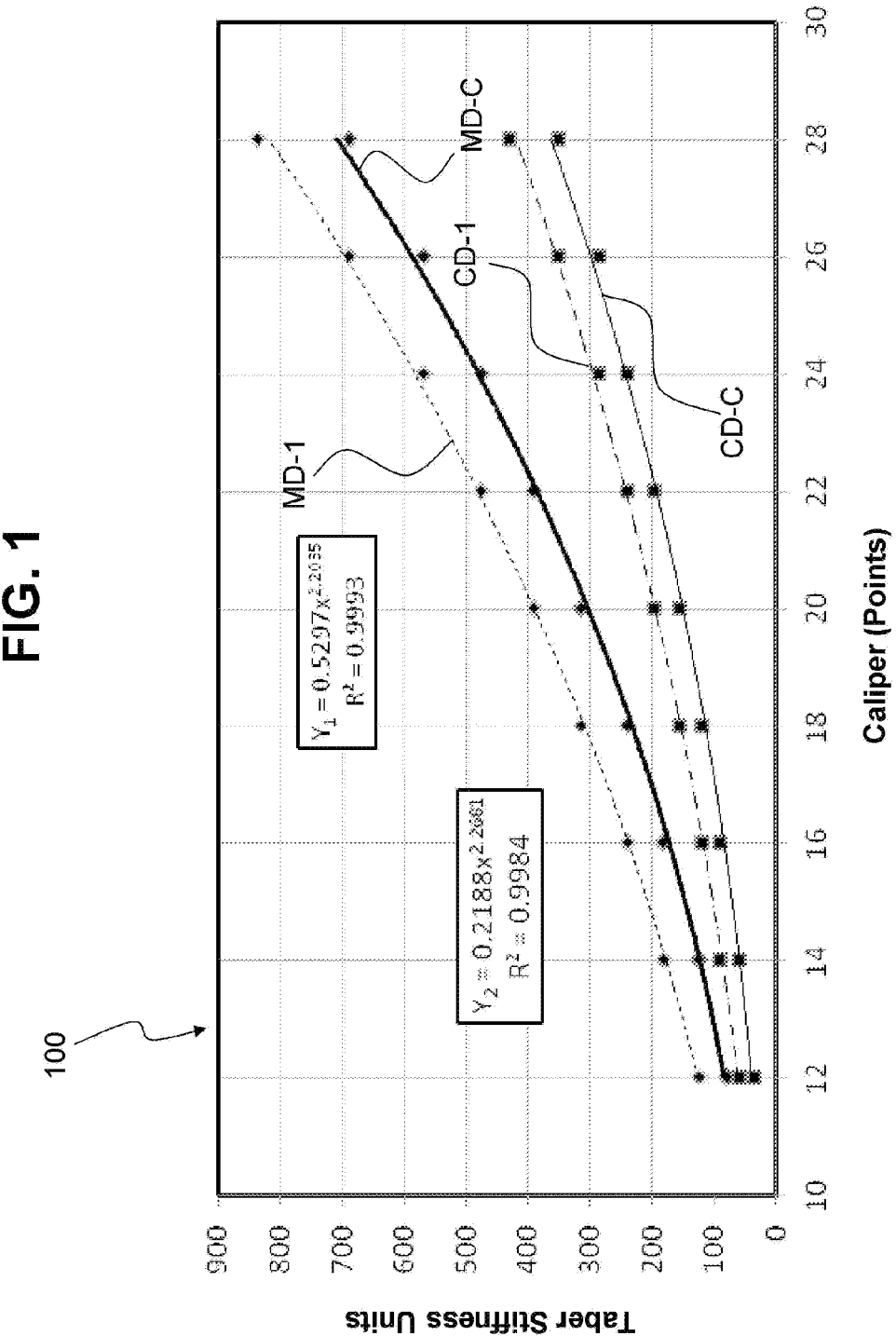
FIG. 1 represents graphical plots of bending stiffness curves in terms of Taber Stiffness Units in both the machine direction (MD) and cross-machine direction (CD) versus caliper of various paperboards which compare the embodiments of the paperboards according to the present invention having improved (minimum) MD and CD bending stiffness values with MD and CD bending stiffness values for control paperboards.

It is advantageous to define several terms before describing the invention. It should be appreciated that the following definitions are used throughout this application.

Definitions

Where the definition of terms departs from the commonly used meaning of the term, applicant intends to utilize the definitions provided below, unless specifically indicated.

For the purposes of the present invention, the term "paperboard web" refers to a fibrous paper web that may be formed, created, produced, etc., from a mixture, furnish, etc., comprising paperboard fibers, paperboard stiffness strengthening agents, etc., plus any other optional papermaking additives such as, for example, internal and/or external paper sizing agents, fillers, wet-strength agents, optical brightening agents, etc. The paperboard web may be in the form of a continuous roll, a discrete sheet, etc.

For the purposes of the present invention, the term "paperboard fibers" refers to any fibrous material which may be used in preparing a fibrous paper web. Paperboard making fibers may include pulp (wood) fibers (e.g., softwood fibers and/or hardwood fibers), kraft fibers (e.g., pulp fibers produced by the kraft pulping process), as well as wood fibers produced by soda, sulfite, magnefite, cold soda, NSSC, etc., pulp making processes, synthetic fibers, waste paper fibers, recycled paper fibers, fibers from any of hemp, jute, ramie, flax, cotton linters, abaca, wood waste, straw, bagasse, bamboo, sisal, etc., as well as any combinations of such fibers.

For the purposes of the present invention, the term "ply of paperboard" refers to a single ply (layer) of a paperboard web having a caliper of from about 8 to about 28 points, such as from about 12 to about 18 points. The ply of paperboard may be in the form of a continuous roll, a discrete sheet, a packaging material blank such as for making a box, etc.

For the purposes of the present invention, the term "softwood fibers" refers to fibrous pulps derived from the woody substance of coniferous trees (gymnosperms) such as varieties of fir, spruce, pine, etc., for example, loblolly pine, slash pine, Colorado spruce, balsam fir, Douglas fir, jack pine, radiata pine, white spruce, lodgepole pine, redwood, etc. North American southern softwoods and northern softwoods may be used to provide softwood fibers, as well as softwoods from other regions of the world. Inclusion of softwood fibers tends to impart greater bending stiffness in paperboards, but also tends to impart rougher and less smooth surfaces in such paperboard.

For the purposes of the present invention, the term "hardwood fibers" refers to fibrous pulps derived from the woody substance of deciduous trees (angiosperms) such as birch, oak, beech, maple, eucalyptus, poplars, etc. Inclusion of hardwood fibers in paperboards tends to impart smoother surfaces in such paperboards.

For the purposes of the present invention, the term "synthetic fibers" refers to fibers other than wood pulp fibers (e.g., other than pulp fibers) and which be made from, for example, cellulose acetate, acrylic, polyamides (such as, for example, Nylon 6, Nylon 6/6, Nylon 12, polyaspartic acid, polyglutamic acid, etc.), polyamines, polyimides, polyamides, polyacrylics (such as, for example, polyacrylamide, polyacrylonitrile, esters of methacrylic acid and acrylic acid, etc.), polycarbonates (such as, for example, polybisphenol A carbonate, polypropylene carbonate, etc.), polydienes (such as, for example, polybutadiene, polyisoprene, polynorbornene, etc.), polyepoxides, polyesters (such as, for example, polyethylene terephthalate, polybutylene terephthalate, polytrimethylene terephthalate, polycaprolactone, polyglycolide, polylactide, polyhydroxybutyrate, polyhydroxyvalerate, polyethylene adipate, polybutylene adipate, polypropylene succinate, etc.), polyethers (such as, for example, polyethylene glycol(polyethylene oxide), polybutylene glycol, polypropylene oxide, polyoxymethylene(paraformaldehyde), polytetramethylene ether(polytetrahydrofuran), polyepichlorohydrin, and so forth), polyfluorocarbons, formaldehyde polymers (such as, for example, urea-formaldehyde, melamine-formaldehyde, phenol formaldehyde, etc.), polyolefins (such as, for example, polyethylene, polypropylene, polybutylene, polybutene, polyoctene, etc.), polyphenylenes (such as, for example, polyphenylene oxide, polyphenylene sulfide, polyphenylene ether sulfone, etc.), silicon containing polymers (such as, for example, polydimethyl siloxane, polycarbomethyl silane, etc.), polyurethanes, polyvinyls (such as, for example, polyvinyl butyral, polyvinyl alcohol, esters and ethers of polyvinyl alcohol, polyvinyl acetate, polystyrene, polymethylstyrene, polyvinyl chloride, polyvinyl pryrrolidone, polymethyl vinyl ether, polyethyl vinyl ether, polyvinyl methyl ketone, etc.), polyacetals, polyarylates, and copolymers (such as, for example, polyethylene-co-vinyl acetate, polyethylene-co-acrylic acid, polybutylene terephthalate-co-polyethylene terephthalate, polylauryllactam-block-polytetrahydrofuran, vinyl chloride, regenerated cellulose such as viscose rayon, glass fibers, ceramic fibers, bicomponent fibers, melamine fibers (e.g., fibers obtained from melamine-formaldehyde resin), etc.

For the purposes of the present invention, the term "bicomponent fibers" refers to fibers comprising a core and sheath configuration. The core and sheath portions of bicomponent fibers may be made from various polymers. For example, bicomponent fibers may comprise a PE (polyethylene) or modified PE sheath which may have a PET (polyethylene terephthalate) or PP (polypropylene) core. In one embodiment, the bicomponent fiber may have a core made of polyester and sheath made of polyethylene. Alternatively, a multi-component fiber with a PP (polypropylene) or modified PP or PE sheath or a combination of PP and modified PE as the sheath or a copolyester sheath wherein the copolyester is isophthalic acid modified PET (polyethylene terephthalate) with a PET or PP core, or a PP sheath-PET core and PE sheath-PP core and co-PET sheath fibers may be employed. Various geometric configurations may be used for the bicomponent fiber, including concentric, eccentric, islands-in-the-sea, side-by-side, etc. The relative weight percentages and/or proportions of the core and sheath portions of the bicomponent fiber may also be varied.

For the purposes of the present invention, the term "paperboard binder coalescing agents" refers to agents which may be added to, combined with, etc., paperboard fibers and starch paperboard binders to cause the starch paperboard binders coalesce on and coat the paperboard fibers, and thus increase to the bending stiffness of the resulting paperboards. Suitable paperboard binder coalescing agents may include combinations, mixtures, etc., of cationic non-starch polymers such as cationic polyacrylamides, cationic polyesters, cationic styrene acrylics, cationic styrene butadiene latexes, cationic polyvinyl alcohols, cationic polyvinyl acetates, etc., and cationic starches (e.g., cationic starch paperboard binders), which have been cooked, reacted, etc., such as, for example, Ceregel from Cerealus Holdings LLC.

For the purposes of the present invention, the term "paperboard binder" refers to paper binder agents for paper webs. Paperboard binders may include synthetic or naturally occurring polymers (or a combination of different polymers), for example, starch binders, as well as non-starch binders such as polyvinyl alcohol (PVOH), proteinaceous adhesives such as, for example, casein or soy proteins, etc.; polymer latexes such as styrene butadiene rubber latexes, acrylic polymer latexes, polyvinyl acetate latexes, styrene acrylic copolymer latexes, etc., or any combination thereof. Paperboard binders useful may comprise exclusively (100%) starch binders, or may comprise minimal amounts (e.g., up to about 10%, such as up to about 1%) other non-starch binders in addition to the starch binders.

For the purposes of the present invention, the term "starch paperboard binders" refers to paper binder agents which comprise exclusively (100%) starch, a starch derivative, etc., or any combination thereof. Suitable starch paperboard binders may be derived from a natural starch, e.g., natural starch obtained from a known plant source, for example, wheat, maize, potato, tapioca (e.g., pearl starch), etc. The starch paperboard binders may be modified (i.e., a modified starch) by one or more chemical treatments known in the paper starch binder art, for example, by oxidation to convert some of OH groups to —COOH groups, etc., to formed oxidized starches. In some cases the starch paperboard binder may have a small proportion of acetyl groups. Alternatively, the starch paperboard binders may be chemically treated to render them cationic (i.e., cationic starch paperboard binders) or amphoteric (i.e., amphoteric starch paperboard binders), i.e., with both cationic and anionic charges. The starch paperboard binders may also be a starch converted to a starch ether, or a hydroxyalkylated starch by replacing some —OH groups with, for example, —OCH$_2$CH$_2$OH groups, —OCH$_2$CH$_3$ groups, —OCH$_2$CH$_2$CH$_2$OH groups, etc., e.g., ethylated starch. A further class of chemically treated starch paperboard binders which may be used are known as the starch phosphates. Alternatively, raw starch may be hydrolyzed by means of a dilute acid, an enzyme, etc., to produce starch paperboard binders in the form of a gum of the dextrin type.

For the purposes of the present invention, the term "paperboard filler" refers to mineral products (e.g., calcium carbonate, kaolin clay, etc.), as well as nonmineral products (e.g., plastic pigments), which may be used in paperboard making to reduce materials cost per unit mass of the paperboard, increase opacity, increase smoothness, etc. The mineral products may be finely divided, for example, the size range of from about 0.5 to about 5 microns. When included, the paperboard filler may comprise from to about 0.1 to about 10% by weight of the paperboard, such as from about 1 to about 5% by weight of the paperboard.

For the purposes of the present invention, the term "paperboard pigment" refers to a material (e.g., a finely divided particulate matter) which may be used or may be intended to be used to affect optical properties of a paperboard. Paperboard pigments may include calcium carbonate pigments, absorptive plastic pigments, clay pigments, kaolin pigments, calcined clay pigments, talc pigments, titanium dioxide pigments, barium sulfate pigments, silica pigments, zeolite pigments, etc. Paperboard pigments may also be platy mineral pigments, non-platy mineral pigments, etc.

For the purposes of the present invention, the term "calcium carbonate" refers various calcium carbonates which may be used as paperboard pigments, such as precipitated calcium carbonate (PCC), ground calcium carbonate (GCC), modified PCC and/or GCC, etc.

For the purposes of the present invention, the term "precipitated calcium carbonate (PCC)" refers to a calcium carbonate which may be manufactured by a precipitation reaction and which may used as a paperboard pigment. PCC may comprise almost entirely of the calcite crystal form of CaCO$_3$. The calcite crystal may have several different macroscopic shapes depending on the conditions of production. Precipitated calcium carbonates may be prepared by the carbonation, with carbon dioxide (CO$_2$) gas, of an aqueous slurry of calcium hydroxide ("milk of lime"). The starting material for obtaining PCC may comprise limestone, but may also be calcined (i.e., heated to drive off CO$_2$), thus producing burnt lime, CaO. Water may added to "slake" the lime, with the resulting "milk of lime," a suspension of Ca(OH)$_2$, being then exposed to bubbles of CO$_2$ gas. Cool temperatures during addition of the CO$_2$ tend to produce rhombohedral (blocky) PCC particles. Warmer temperatures during addition of the CO$_2$ tend to produce scalenohedral (rosette-shaped) PCC particles. In either case, the end the reaction occurs at an optimum pH where the milk of lime has been effectively converted to CaCO$_3$, and before the concentration of CO$_2$ becomes high enough to acidify the suspension and cause some of it to redissolve. In cases where the PCC is not continuously agitated or stored for many days, it may be necessary to add more than a trace of such anionic dispersants as polyphosphates. Wet PCC may have a weak cationic colloidal charge. By contrast, dried PCC may be similar to most ground CaCO$_3$ products in having a negative charge, depending on whether dispersants have been used. The calcium carbonate may be precipitated from an aqueous solution in three different crystal forms: the vaterite form which is thermodynamically unstable, the calcite form which is the most stable and the most abundant in nature, and the aragonite form which is metastable under normal ambient conditions of temperature and pressure, but which may convert to calcite at elevated temperatures. The aragonite form has an orthorhombic shape that crystallizes as long, thin needles that may be either aggregated or unaggregated. The calcite form may exist in several different shapes of which the most commonly found are the rhombohedral shape having crystals that may be either aggregated or unaggregated and the scalenohedral shape having crystals that are generally unaggregated.

For the purposes of the present invention, the term "calendered paperboard" refers to a paperboard which has been subjected to calendering to, for example, smooth out the material for enabling printing on the material, to increase the gloss on the material surface, etc. For example, calendering may involve a process of using pressure (and optionally temperature and moisture) for embossing a smooth surface on the still rough material surface. Calendering may be carried out on a calender which may comprise a series of calender rolls at the end of, for example, a papermaking machine (on-line), or separate from the papermaking machine (off-line). Calendering may include supercalendering, hot-soft calendering, moisture-gradient calendering, extended nit calendering, belt calendering, etc. See G. A. Smook, Handbook for Pulp and Paper Technologists ($2^{nd}$ Edition, 1992), pages 273-78, the entire contents and disclosure of which is herein incorporated by reference, for a general description of calendering, as well as devices for carrying out calendering, that may be useful herein.

For the purposes of the present invention, the term "basis weight" refers to the grammage of a sheet, roll, etc., of material comprising the paperboard, with or without layers or coatings, as determined by TAPPI test T410. See G. A. Smook, Handbook for Pulp and Paper Technologists ($2^{nd}$ Edition, 1992), page 342, Table 22-11, the entire contents and disclosure of which is herein incorporated by reference, which describes the physical test for measuring basis weight. The basis weight of the paperboard is essentially a measure of the density of that paperboard per unit area, herein reflected in units of lbs/3000 ft$^2$. Suitable basis weights for use herein are in the range of from about 105 to about 300 lbs/3000 ft$^2$, such as from about 140 to about 200 lbs/3000 ft$^2$.

For the purposes of the present invention, the term "caliper," refers to the thickness of a sheet, web, etc., of a material, for example, a material comprising the paper web, with or without layers or coatings, before or after calendaring, in mils, as determined by measuring the distance between smooth, flat plates at a defined pressure.

For the purposes of the present invention, the term "mil(s)" is used in the conventional sense of referring to thousandths of an inch and is also referred to interchangeably herein as "points."

For the purposes of the present invention, the term "MD" refers to machine direction of the paperboard, i.e., is used in the conventional papermaking sense of the direction the paperboard moved during its formation.

For the purposes of the present invention, the term "CD" refers to the cross-machine direction, i.e., is used in the conventional papermaking sense of the direction transverse to the machine direction (MD).

For the purposes of the present invention, the term "bending stiffness" (also referred to interchangeably herein as "bending resistance" refers to flexural rigidity of the paperboard, especially the specific flexural rigidity. Bending stiffness depends upon both the modulus of elasticity of and thickness of the paperboard board. Bending stiffness is measured herein in terms of Taber Stiffness Units in either the machine direction (MD) or cross-machine direction (CD).

For the purposes of the present invention, the term "flexural rigidity" refers to a measure of the stiffness of a paper strip, such as a strip of paperboard, in terms of its width (breadth), tensile modulus or elastic modulus (i.e., Young's modulus), and caliper (thickness).

For the purposes of the present invention, the term "specific flexural rigidity" refers to the flexural rigidity of the paperboard in terms of its width (breadth).

For the purposes of the present invention, "Taber Stiffness Units" are defined as the bending moment of ⅕ of a gram applied to a 1.5" wide specimen of paperboard at a 5 centimeter test length, flexing it to an angle of 15°. A Taber Stiffness Unit is the equivalent of one gram centimeter. The method used herein for measuring Taber Stiffness is TAPPI T566 (Bending Resistance (Stiffness) of Paper).

For the purposes of the present invention, the term "Huygen Bond" refers to the degree of internal bonding of the paperboard/paperboard fibers and is measured in units of ft. lbs/in$^2$. The Huygen Bond values of a paperboard may be measured in the machine direction (MD), as well as the cross-machine (CD) direction by using TAPPI T569 om-99 (Internal Bond Strength (Scott Type)).

For the purposes of the present invention, the term "bulk" refers to the volume or thickness of the paperboard in relation to its weight. Bulk is the reciprocal of the density (weight per unit volume), and may be calculated from caliper and basis weight of the paperboard. Decreasing the bulk (or in other words, increasing the density) of, for example, a sheet of paperboard, causes that sheet to be smoother, glossier, less opaque, darker, lower in strength, etc.

For the purposes of the present invention, the term "solids basis" refers to the weight percentage of each of the respective solid materials (e.g., paperboard fibers, paperboard stiffness strengthening agents, paperboard pigments, etc.) present in the composition, etc., in the absence of any liquids (e.g., water, other solvents, etc.). Unless otherwise specified, all percentages given herein for the solid materials are on a solids basis.

For the purposes of the present invention, the term "lbs/ton" refers to the amount (lbs) of paperboard stiffness strengthening agent relative to the amount (ton) of paperboard fibers.

For the purposes of the present invention, the term "solids content" refers to the percentage of non-volatile, non-liquid components (by weight) that are present in the composition, etc.

For the purpose of the present invention, the term "applying" with reference to the coatings, and compositions used to provide such coatings, may include adding, depositing, spraying, daubing, spreading, wiping, dabbing, dipping, printing, etc.

For the purposes of the present invention, the term "Parker Print Smoothness" refers to the extent to which the paper surface deviates from a planar or substantially planar surface, as affected by the depth of the paper, paper width, numbers of departure from that planar surface, etc., as measured by TAPPI test method T 555 om-99 at a clamping pressure of 10 kgf/cm$^2$. Parker Print Smoothness values reflect the degree of "microroughness" of the paperboard or coating surface. The higher the Parker Print Smoothness value, the rougher the paperboard, or coating surface thereof. Conversely, the lower Parker Print Smoothness value, the smoother the paperboard, or coating surface thereof. For the embodiments of the paperboards of the present invention, the Parker Print Smoothness values may be about 3 or less, such as about 2 or less, such as in the range of from about 1 to about 1.5.

For the purposes of the present invention, the term "Solid Bleached Sulfate (SBS)" refers to a U.S. grade of bleached paperboard coated on one or both sides with a paperboard pigment. The corresponding European grade of SBS is SBB/GZ (wherein G=coated and Z=bleached virgin chemical pulp), and the corresponding Asian grade is Ivoryboard.

For the purposes of the present invention, the term "Coated Unbleached Kraft (CUK)" refers to a U.S. grade of kraft unbleached paperboard coated on one or both sides with a paperboard pigment. The corresponding European grade of CUK is coated SUB/GN (wherein G=coated and N=unbleached virgin chemical pulp).

For the purposes of the present invention, the term "Multi-Ply Recycled (MPP)" refers to a U.S. grade of pigment coated multi-ply paperboard with recycled inner layers (plies) and bleached outer layer(s) (plies). The corresponding European grade of MPP is coated GD/GT (wherein G=coated, D=recycled with grey back, and T=recycled with white or cream back), and the corresponding Asian grade is Coated Duplex-Greyback, Whiteback, and White Lined Chip (WLC).

For the purposes of the present invention, the term "Coated Recycled Board (CRB)" refers to a U.S. grade of recycle paperboard coated on one side.

For the purposes of the present invention, the term "Uncoated Recycled Board (URB)" refers to a U.S. grade of uncoated recycled paperboard. The corresponding European grades of URB are chipboard, coreboard, gypsum wallboard facing paper, etc., and the corresponding Asian grades are greyboard, coreboard, gypsum wallboard facing paper, etc.

For the purposes of the present invention, the term "Folding Boxboard (European Style FFB)" refers to a U.S. grade of pigment coated multi-ply paperboard with a mechanical pulp inner layer (ply). The corresponding European grade of Folding Boxboard is FBB/FCI (wherein C=virgin mechanical pulp), and the corresponding Asian grade is Ivoryboard.

For the purposes of the present invention, the term "liquid" refers to a non-gaseous fluid composition, compound, material, etc., which may be readily flowable at the temperature of use (e.g., room temperature) with little or no tendency to disperse and with a relatively high compressibility.

For the purposes of the present invention, the term "room temperature" refers to the commonly accepted meaning of room temperature, i.e., an ambient temperature of 20° to 25° C.

For the purposes of the present invention, the term "wet end" refers to that portion of the papermaking process involving an aqueous slurry of paper fibers, fillers, other additives (e.g., wet strength agents), etc. The wet end of papermaking often deals with the interactions between paper furnish materials and the chemical/chemical physical processes which occur at the wet end of the papermaking machine. See G. A. Smook, Handbook for Pulp and Paper Technologists (2$^{nd}$ Edition, 1992), pages 219-21, the entire contents and disclosure of which is herein incorporated by reference, for a general description of wet end chemistry that occurs during papermaking, such as paperboard making Description One of the primary functions of packaging is to protect the product within that packaging. One such function is the ability of the package (e.g., a box made from folded paperboard) to withstand the forces encountered during distribution, display, etc., of that package. The package will desirably remain closed (unopened) and will also protect the product inside of the package. During shipping, some of the primary modes of abuse of packaged products are vibrations during transport, for example, as may occur during transport in trucks or rail cars and/or by dropping of the packaged product. Also during shipping of the packaged product, a majority of the abuse of a packaged product may occur in the vertical direction as cases of the packaged product are bounced bout when, for example, the truck or rail car encounters (strikes) obstructions in the vehicles path. Assuming that the packaged product(s) remain in an "end up" configuration, most, but not all, of the dropping of the packaged product may thus occur in the vertical direction.

These vertical impacts may result in the compressive forces being applied to the package. For example, many packaged products are rectangular in configuration with the longest axis of the packaged product being in the vertical direction. Accordingly, the packaged product (and any such abuse thereof) may be modeled as a rectangular column. Disregarding damage which may be caused by punctures or cutting, the primary mode of damage may be due to buckling of the sidewalls of the package containing the product. In this mode, the physical strength of the package can be assumed to follow the Euler buckling equation (1):

$$P=(n \times \pi^2 \times E \times I)/L^2 \qquad (1)$$

wherein P=the allowable load (in lbs.), n=a factor accounting for the end conditions, E=the modulus of elasticity (in lb./in$^2$ or kPa), L=the length of column (in inches or meters), and I=the moment of inertia (in in$^4$ or mm$^4$).

Relative to the factor accounting for end conditions (n), for a column pivoted at both ends, n=1. For a column having one end fixed, and the other end round, n=2. For a column having both ends fixed, n=4. For a column having one fixed end and one free end, n=0.25.

From the Euler buckling equation (1) above, it can be seen that increasing the modulus of elasticity (E) also increases the allowable load (P) that the column may withstand before buckling. While many packages may be shorter than what would be considered a long slender column, nonetheless, the application of a vertical force to the package tends to produce failure modes similar to such long columns, wherein one or more panels of the package may buckle.

Besides the Euler buckling equation (1) above, one of the best measures of bending stiffness of a material such as paperboard is a parameter generally referred to as "flexural rigidity." Flexural rigidity provides a measure of the stiffness of a paper strip, such as a strip of paperboard which may be folded to form a package. In fact, stiffness may often be most important property in folding box paperboards because the utility of the box as a package may depend upon its resistance to bulging, buckling, etc., when filled with a product.

Flexural rigidity (FR) of may be defined by the equation (2):

$$FR=(1/12) \times b \times E \times t^3 \qquad (2)$$

wherein b is the width (breadth) of the paper strip, E is Young's modulus of the paper strip also known as the tensile modulus or elastic modulus which is a measure of the stiffness of an elastic material and is defined by the ratio of the stress along an axis over the strain along that axis in the range of that stress), and t is the caliper of that paper.

A closely related quantity to flexural rigidity (FR) is the specific flexural rigidity (SPR), which may be defined by the equation (3):

$$SPR=FR/b=1/12 \qquad (3)$$

What specific flexural rigidity (SPR) does is define the flexural rigidity (FR) in terms of the width of the paper strip (e.g., paperboard). In fact, the caliper t (thickness) of paper, such as paperboard, has a very strong effect on its bending stiffness, as shown above by equations (2) and (3). For example, doubling the caliper of paper or paperboard means an eightfold increase in bending stiffness. Because paperboards tend to have a higher (greater) caliper t (thickness) than paper, the thicker paperboard tends to be much stiffer than paper. Accordingly, the bending stiffness in paperboards has previously been achieved by, for example, increasing the caliper of the paperboard. Unfortunately, increasing the caliper of paperboard also generally causes an increase in basis weight of the paperboard, as basis weight and caliper (thickness) are linearly related (especially for a given papermaking machine and grade of paperboard). A higher basis weight paperboard creates a heavier package, causing an increase the shipping weight of the packaged product, and thus an increase in shipping costs of the packaged product.

Improved bending stiffness may also be imparted to the paperboard by simply increasing the density (densifying) of the paperboard. Such densification also decreases the caliper (thickness) of the paperboard. But densification of the paperboard to increase bending stiffness may cause other disadvantages such as difficulty scoring the sheet, damage to the sheet surface due to crushing, reduction in tensile strength, etc.

Improved bending stiffness may also be imparted to singly ply paperboards by increasing the content of softwood fibers. Unfortunately, the potential disadvantage in increasing the softwood fiber content of paperboards is increased roughness and decreasing smoothness of the surface of the paperboard which makes printing on the surface of such paperboards more difficult and less optimum. To compensate for such surface roughness, multi-ply paperboards having an interior paperboard ply comprising primarily softwood fibers for imparting bending stiffness (or ground wood fibers for increased bulk), and outer plys comprising primarily hardwood fibers for improved surface smoothness. Increasing the bulk (e.g., by inclusion of ground wood fibers results in greater thickness which increases the bending stiffness. But multi-ply paperboards may suffer from delamination between the respective plies when the multi-ply paperboard is scored, bent, etc.

By contrast, embodiments of the paperboard of the present invention achieve improved bending stiffness in single paperboard ply, yet while essentially maintaining the basis weight of the paperboard, as well as increasing the content of hardwood paperboard fibers for increased smoothness benefits. For example, embodiments of the present invention enable paperboards comprising increased hardwood paperboard fiber content to be manufactured which have reduced caliper (e.g., a reductions in caliper of as much as about 2 points), yet maintain at least equivalent bending stiffness to paperboards having the higher calipers, as well as providing the surface smoothness of paperboard plies comprising higher contents of hardwood fibers. These bending stiffness/surface smoothness benefits in the single ply of paperboard embodiments of the present invention may be achieved by improving fiber to fiber bonding throughout the paperboard by utilizing paperboard stiffness strengthening agents, along with of other paperboard binders (e.g., starch) in a portion of the hardwood paperboard fiber stream to provide at least some treated hardwood paperboard fibers.

Embodiments of the article comprising improved bending stiffness paperboard comprise a ply of paperboard that includes: paperboard fibers comprising at least about 50% by weight hardwood fibers (and up to 100% by weight hardwood fibers, for example, from about 60 to about 95% by weight hardwood fibers, such as from about 65 to about 80% by weight hardwood fibers, the balance, if any, being softwood fibers); a starch paperboard binder (e.g., cationic starch or oxidized); and paperboard stiffness strengthening agent in an amount sufficient (for example, at least about 0.1% by weight of the starch paperboard binder, such as from about 0.3 to about 1% by weight of the starch paperboard binder) to cause the starch paperboard binder to coalesce on and coat (partially or completely) at least some/at least a portion of the paperboard fibers. The paperboard has: (a) a caliper of from about 8 to about 28 points (such as from about 12 to about 18 points); (b) a basis weight in the range of from about 105 to about 300 lbs/3000 ft$^2$ (such as from about 140 to about 200 lbs/3000 ft$^2$); (c) a MD bending stiffness equal to or greater than a first curve defined by equation (4), $y^1=0.5297x^{2.2095}$, wherein x is the caliper of the paperboard and $y^1$ is the MD bending stiffness in Taber Stiffness Units; and (D) a CD bending stiffness equal to or greater than a second curve defined by equation (5), $y^2=0.2188x^{2.2681}$, wherein x is the caliper of the paperboard and $y^2$ is the CD bending stiffness in Taber Stiffness Units. (See curves MD-1 and CD-1 in FIG. 1 as discussed below.) In some embodiments, the paperboard has: (c) a maximal MD bending stiffness no greater than a third curve defined by equation (6), $y^1=0.7949x^{2.2095}$, wherein x is again the caliper of the paperboard and $y^1$ is again the MD bending stiffness in Taber Stiffness Units; and (d) a maximal CD bending stiffness no greater than a fourth curve defined by equation (7), $y^2=0.3282x^{2.2095}$, wherein x is again the caliper of the paperboard and $y^2$ is again the CD bending stiffness in Taber Stiffness Units. (See curves MD-2 and CD-2 in FIGS. 2 and 3 as discussed below.) Some embodiments of the paperboards of the present invention may also have a Parker Print Smoothness value of about 3 or less, such as about 2 or less, e.g., in the range of from about 1 to about 1.5.

In some embodiments of the present invention, a multi-ply paperboard product may be formed which comprises a ply of the improved bending stiffness paperboard as a first interior ply, the first interior ply having a first side and second side. The multi-ply paperboard product also comprises an additional exterior ply or plies of a different paperboard(s) positioned on, disposed on, adhered to, etc., one or both of the first and second sides, i.e., may be formed as a multi-ply paperboard product. In other embodiments of the present invention, a single ply paperboard product may be formed which consists essentially of a single ply of the improved bending stiffness paperboard.

Embodiments of the improved bending stiffness paperboards of the present invention may be prepared by providing a first stream of treated paperboard fibers comprising: untreated paperboard fibers comprising at least about 80% by weight untreated hardwood paper fibers (and up to 100% by weight untreated hardwood paper fibers, for example from about 85 to 100% weight hardwood fibers, such as from about 90 to 100% by weight hardwood fibers, the balance, if any, being softwood fibers); a starch paperboard binder in a weight ratio of starch paperboard binder to untreated paperboard fibers of from about 0.1:1 to about 2:1 (such as from about 0.5:1 to about 1.5:1); and a paperboard binder coalescing agent in an amount sufficient to cause the starch paperboard binder to coalesce and coat (partially or completely) at least some of the paperboard fibers to provide treated paperboard fibers. The combination of untreated paperboard fibers, starch paperboard binder, and paperboard binder coalescing agent may be heated, cooked, reacted, etc., at temperatures in the range of from about 150° to about 212° F., such as from about 170° to about 190° F., for up to about 5 minutes (such as for up to about 2 minutes) to form the first treated paperboard fiber stream. This first treated paperboard fiber stream is combined with a second untreated paperboard fiber stream comprising at least about 50% by weight untreated hardwood fibers (and up to 100% by weight untreated hardwood fibers, for example, from about 60 to about 95% by weight untreated hardwood fibers, such as from about 65 to about 80% by weight untreated hardwood fibers) in a weight ratio of treated paperboard fibers to combined treated and untreated paperboard fibers in the range of from about 15 to about 50 lbs/ton (such as in the range of from about 20 to about 40 lbs/ton) to provide a treated paperboard web. This treated paperboard web is then formed into the improved bending stiffness paperboard having the caliper values and basis weight values described above, as well as the at least the minimum MD bending and CD stiffness values as described above, i.e., equal to or greater than the first and second curves defined, respectively, by equations (4) and (5) above, and in some embodiments, having the maximal MD bending and CD stiffness values as described above i.e., no greater than the third and fourth curves defined, respectively, by equations (6) and (7) above.

FIG. 1 represents graphical plots, indicated generally as 100, of various paperboards in terms of bending stiffness (in Taber Stiffness Units) in both the machine direction (MD)

and cross-machine direction (CD) versus caliper (in points, also equivalent to mils). Points for the respective curves are plotted at calipers of 12, 14, 16, 18, 20, 22, 24, 26, and 28. Curves MD-C and CD-C represent, respectively, the graphical plots of MD and CD bending stiffness values versus caliper of the control paperboards where the curve MD-C is based on the equation (8), $c^1=1576x^{2.5239}$, wherein x is the caliper of the paperboard and $c^1$ is the MD bending stiffness in Taber Stiffness Units, and where curve CD-C is based on the equation (9), $c^2=0.0585x^{2.6209}$, wherein x is the caliper of the paperboard and $c^2$ is the CD bending stiffness in Taber Stiffness Units. By contrast, curves MD-1 and CD-1 represent, respectively, graphical plots of the MD and CD bending stiffness values versus caliper for embodiments of the paperboards of the present invention having improved (minimum) MD and CD bending stiffness values, where curve MD-1 involves on plotting caliper (x) values based on equation (4) above, and where curve CD-1 involves plotting caliper (x) values based on equation (5) above. As be seen in FIG. 1, the embodiments of the paperboards of the present invention have higher (improved) MD and CD bending stiffness values, relative to the MD and CD bending stiffness values of the control paperboards having the same caliper (thickness).

Figure 2:
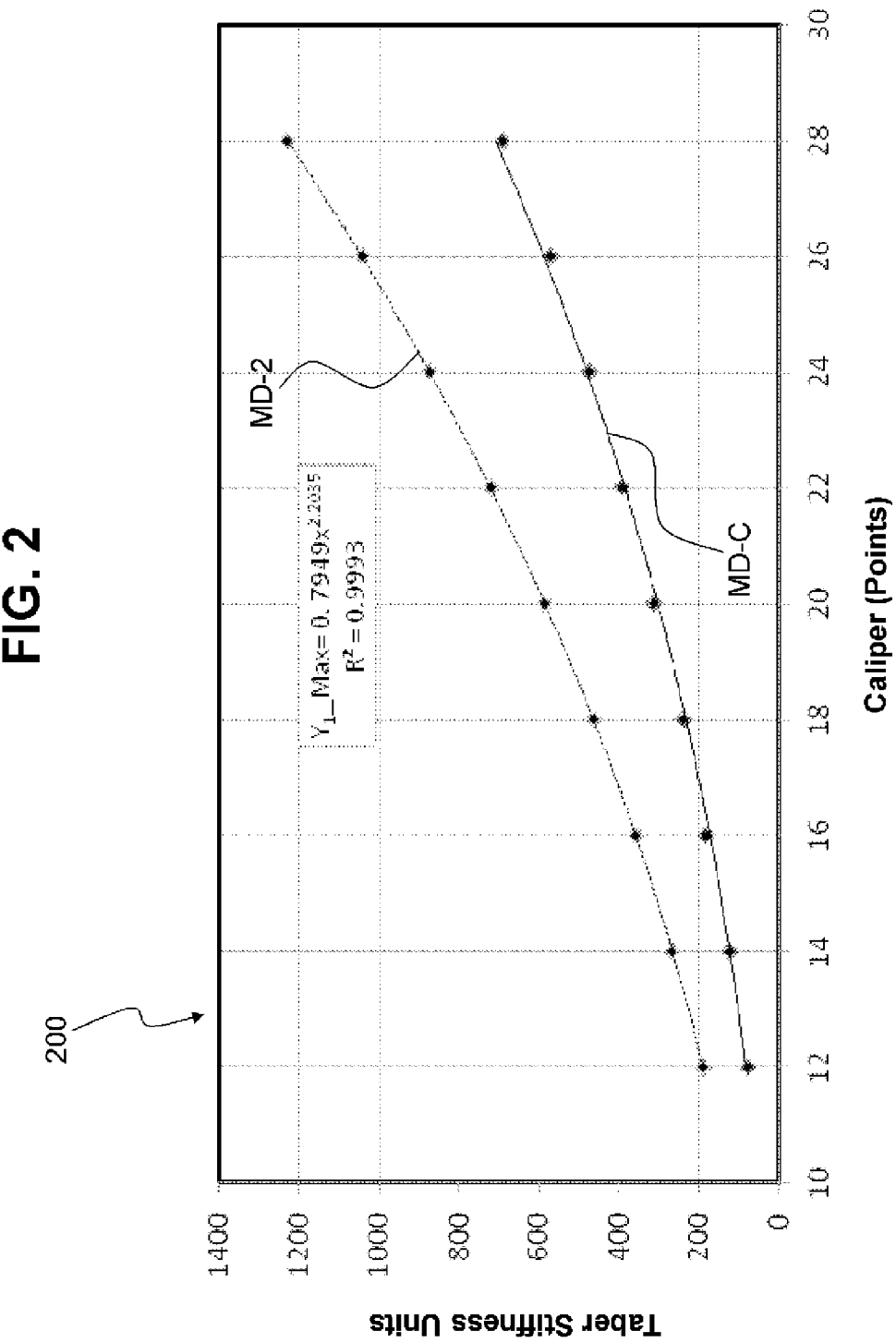
FIG. 2 represents graphical plots of bending stiffness curves in terms of Taber Stiffness Units in the machine direction (MD) versus caliper which compare the embodiments of the paperboards according to the present invention having improved (maximum) MD bending stiffness values, with the MD bending stiffness values for control paperboards.

FIG. 2 represents graphical plots, indicated generally as 200, of the bending stiffness curves in terms of Taber Stiffness Units in the machine direction (MD) versus caliper which compare embodiments for the paperboards according to the present invention having improved (maximum) MD bending stiffness values, with MD bending stiffness values for control paperboards. Curve MD-C (see also FIG. 1) represents the graphical plot of the MD bending stiffness values versus caliper of the control paperboards. By contrast, curve MD-2 represents a graphical plot of the bending stiffness values versus caliper for the embodiments of the paperboards of the present invention having improved (maximum) MD bending stiffness values. Curve MD-2 involves plotting of caliper (x) values based on equation (6) above.

Figure 3:
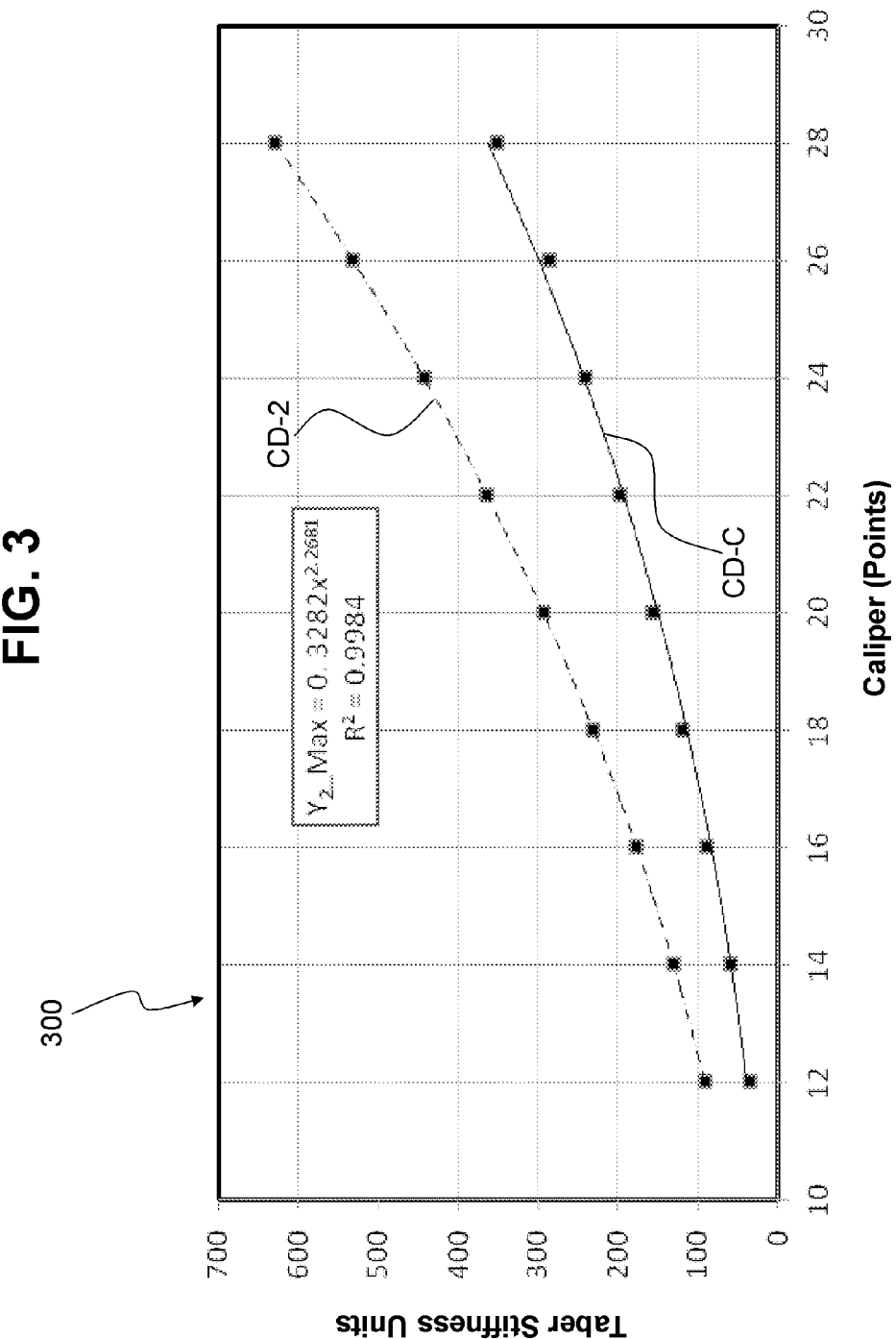
FIG. 3 represents graphical plots of bending stiffness curves in terms of Taber Stiffness Units in the cross-machine direction (CD) versus caliper which compare the embodiments of the paperboards according to the present invention having improved (maximum) CD bending stiffness values with the CD bending stiffness values for control paperboards.

FIG. 3 represents graphical plots, indicated generally as 300, of the bending stiffness curves in terms of Taber Stiffness Units in the cross-machine direction (CD) versus caliper which compare embodiments for the paperboards according to the present invention having improved (maximum) CD bending stiffness values, with the MD bending stiffness values for control paperboards. Curve CD-C (see also FIG. 1) represents the graphical plot of the CD bending stiffness values versus caliper of the control paperboards. By contrast, curve CD-2 represents a graphical plot of the CD bending stiffness values versus caliper for the embodiments of the paperboards of the present invention having improved (maximum) CD bending stiffness values. Curve CD-2 involves plotting caliper (x) values in equation (7) above.

FIG. 4 represents a flowchart to illustrate an embodiment of a method for preparing improved bending stiffness paperboards according to the present invention, which is generally indicated as 400. In one step of method 400, as source of Paperboard Fibers (comprising at least about 80% by weight, such as at least about 90% by weight, and up to and including 100% by weight, hardwood fibers), indicated as 402, a source of Starch (Paperboard) Binder, indicated as 404, and as a source of a Paperboard Stiffness Strengthening Agent/[Adhesion Promoter] are combined together (appropriate amounts, as described above), as indicated by arrows 408, 410, and 442, and then heated, cooked, reacted, etc., at a temperature in the range of from about 150° to about 212° F. (such as from about 170° to about 190° F.) for up to about 5 minutes (such as up to about 2 minutes) to form a Treated Fiber Stream, indicated as 410.

In the next step, an Untreated Fiber Stream (e.g., comprising at least about 50% by weight, and including up to 100% by weight hardwood fibers, such as from about 65 to about 80% by weight hardwood fibers), indicated by 416, is combined together with this Treated Fiber Stream 410, as indicated by arrows 418 and 420, in appropriate weight ratios (as described above), and is then deposited on, for example, a paperboard forming wire, to provide a Paperboard Web, as indicated as 422. Paperboard Web 422. Paperboard Web 434 may then be further processed, e.g., calendered, dried, applying aqueous barrier coatings, pigmented coatings, extrusion coatings, or laminations, etc., as indicated by arrow 424, to provide a Paperboard, as indicated by 426, having the caliper values, basis weight values, and improved MD and CD bending stiffness values (as described above) according to embodiments of the present invention.

EXAMPLES

Paperboards having a caliper of about 16.5 points and a basis weight in the range are formed from paperboard fiber streams comprising 100% by weight hardwood fibers. For the Control (C) Paperboard, no starch paperboard binder is used in preparing the paperboard. Three samples (S-1, S-2, and S-3) of paperboards are also prepared by combining a treated hardwood fiber stream and an untreated hardwood fiber stream at varying weight ratios (lbs/ton) of treated hardwood fibers to combined treated and untreated hardwood fibers. The treated hardwood fiber stream is prepared from a hardwood fibers, cationic starch as the paperboard binder in about a 1:1 weight ratio of starch to hardwood fibers, and about 0.7% (by weight of the starch) of Ceregel A. This mixture of hardwood fibers, starch, and Ceregel is cooked at about 170°-190° F. for 2 minutes to provide the treated hardwood fiber stream before being combined with the untreated hardwood fiber stream to prepare the S-1, S-2, and S-3 Paperboards.

The properties of the Control (C) Paperboard, as well as the S-1, S-2, and S-3 Paperboards are shown in Table 1 below:

TABLE 1

|  | Control (C) | Sample S-1 | Sample S-2 | Sample S-3 |
| --- | --- | --- | --- | --- |
| Caliper (points) | 16.5 | 16.5 | 16.5 | 16.5 |
| Basis Weight (lbs/3000 ft²) | 165 | 165 | 165 | 165 |
| MD Bending Stiffness (Taber Stiffness Units)[1] | 284.0 | 266.6 | 296.6 | 344.2 |
| CD Bending Stiffness (Taber Stiffness Units)[1] | 115.8 | 115.0 | 129.8 | 148.2 |
| lbs/ton[1] | 0 | 10 | 20 | 50 |

[1] g-cm.
[2] lbs (treated fiber) per ton (treated + untreated fiber)

The results from Table 1 show is an initial decrease in bending stiffness (compare S-1 to C), followed by an increase in bending stiffness (compare S-2 and S-3 to C).

All documents, patents, journal articles and other materials cited in the present application are hereby incorporated by reference.

Although the present invention has been fully described in conjunction with several embodiments thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. An article comprising a ply of paperboard comprising:
   paperboard fibers which comprise at least about 50% by weight hardwood fibers;
   a starch paperboard binder, and
   a paperboard binder coalescing agent in an amount sufficient to cause the starch paperboard binder to coat at least a portion of the paperboard fibers;
   the paperboard having:
      a caliper of from about 8 to about 28 points;
      a basis weight in the range of from about 105 to about 300 lbs/3000 ft$^2$;
      a MD bending stiffness equal to or greater than a first curve defined by the equation:

$$y^1 = 0.5297 x^{2.2095},$$

wherein x is the caliper of the paperboard and y$^1$ is the MD bending stiffness in Taber Stiffness Units; and
      a CD bending stiffness equal to or greater than a second curve defined by the equation:

$$y^2 = 0.2188 x^{2.2681},$$

wherein x is the caliper of the paperboard and y$^2$ is the CD bending stiffness in Taber Stiffness Units.

2. The article of claim 1, wherein the caliper is in the range of from about 12 to about 18 points.

3. The article of claim 1, wherein the basis weight is in the range of from about 140 to about 200 lbs/3000 ft$^2$.

4. The article of claim 1, wherein the paperboard binder coalescing agent comprises the cooked combination of a cationic non-starch polymer and a cationic starch in an amount of at least about 0.1% by weight of the starch paperboard binder.

5. The article of claim 4, wherein the paperboard coalescing agent comprises the cooked combination of a cationic polyacrylamide and a cationic starch in an amount of from about 0.3 to about 1% by weight of the starch paperboard binder.

6. The article of claim 1, wherein the paperboard has:
   a MD bending stiffness no greater than a third curve defined by the equation:

$$y^1 = 0.7949 x^{2.2095}; \text{ and}$$

a CD bending stiffness no greater than a fourth curve defined by the equation:

$$y^2 = 0.3282 x^{2.2095}.$$

7. A multi-ply paperboard product which comprises a ply of the paperboard of claim 1 as a first interior ply having a first side and second side, and at least one additional different paperboard as an exterior ply positioned on one or both of the first and second sides.

8. A single ply paperboard product which consists essentially of a single ply of the paperboard of claim 1.

9. The article of claim 1, wherein the starch paperboard binder comprises one or more of: cationic starch, oxidized starch, pearl starch, or ethylated starch.

10. The article of claim 9, wherein the starch paperboard binder comprises cationic starch.

11. The article of claim 1, wherein the paperboard fibers comprise from about 60 to about 95% by weight hardwood fibers.

12. The article of claim 11, wherein the paperboard fibers comprise from about 65 to about 80% by weight hardwood fibers.

13. The article of claim 1, wherein the paperboard has a Parker Print Smoothness value about 3 or less.

14. The article of claim 13, wherein the paperboard has a Parker Print Smoothness value about 2 or less.

15. The article of claim 14, wherein the paperboard has a Parker Print Smoothness value from about 1 about 1.5.

16. A method for preparing a paperboard, which comprises the following steps:
   (a) providing a first stream of treated paperboard fiber stream comprising:
      untreated paperboard fibers comprising at least about 80% by weight untreated hardwood fibers;
      a starch paperboard binder in a weight ratio of starch paperboard binder to untreated paperboard fibers of from about 0.1:1 to about 2:1; and
      a paperboard binder coalescing agent in an amount sufficient to cause the paperboard binder to coat at least some of the untreated paperboard fibers to provide treated paperboard fibers;
   (b) combining the first treated paperboard fiber stream of step (a) with a second untreated paperboard fiber stream comprising at least about 50% by weight untreated hardwood fibers in a weight ratio of treated paperboard fibers to combined treated and untreated paperboard fibers in the range of from about 15 to about 50 lbs/ton to provide a paperboard web; and
   (c) forming the paperboard web of step (b) into paperboard having:
      a caliper of from about 8 to about 28 points;
      a basis weight in the range of from about 105 to about 300 lbs/3000 ft$^2$;
      a MD bending stiffness equal to or greater than a first curve defined by the equation:

$$y^1 = 0.5297 x^{2.2095},$$

wherein x is the caliper of the paperboard and y$^1$ is the MD bending stiffness in Taber Stiffness Units; and
      a CD bending stiffness equal to or greater than a second curve defined by the equation:

$$y^2 = 0.2188 x^{2.2681},$$

wherein x is the caliper of the paperboard and y$^2$ is the CD bending stiffness in Taber Stiffness Units.

17. The method of claim 16, wherein the paperboard binder coalescing agent comprises the cooked combination of a cationic non-starch polymer and a cationic starch in an amount of at least about 0.1% by weight of the starch paperboard binder of step (a).

18. The method of claim 17, wherein the paperboard coalescing agent comprises the cooked combination of a cationic polyacrylamide and a cationic starch in an amount of from about 0.3 to about 1% by weight of the starch paperboard binder of step (a).

19. The method of claim 16, wherein the first treated paperboard fiber stream of step (a) comprises starch paperboard binder in a weight ratio of starch paperboard binder to untreated paperboard fibers of from about 0.5:1 to about 1.5:1

20. The method of claim 16, wherein the untreated paperboard fibers of step (a) comprise from about 85 to 100% weight hardwood fibers.

21. The method of claim 20, wherein the untreated paperboard fibers of step (a) comprise from about 90 to 100% weight hardwood fibers.

22. The method of claim 16, wherein step (b) is carried out by combining the first treated paperboard fiber stream of step (a) with a second untreated paperboard fiber stream in a weight ratio of treated paperboard fibers to combined treated and untreated paperboard fibers in the range of from about 20 to about 40 lbs/ton.

23. The method of claim 16 wherein the first treated paperboard fiber stream of step (a) is formed by heating the untreated paperboard fibers, starch paperboard binder, and paperboard binder coalescing agent at temperatures in the range of from about 150° to about 212° F.

24. The method of claim 23 wherein the first treated paperboard fiber stream of step (a) is formed by heating the untreated paperboard fibers, starch paperboard binder, and paperboard binder coalescing agent at temperatures in the range of from about 170° to about 190° F.

25. The method of claim 16, wherein the second untreated paperboard fiber stream of step (b) comprises from about 60 to about 95% by weight untreated hardwood fibers.

26. The method of claim 25, wherein the second untreated paperboard fiber stream of step (b) comprises from about 65 to about 80% by weight untreated hardwood fibers.

27. The method of claim 16, wherein the paperboard web of step (b) is formed in step (c) into paperboard having a caliper of from about 12 to about 18 points and a basis weight in the range of from about 140 to about 200 lbs/3000 ft$^2$.

28. The method of claim 16, wherein the paperboard web of step (b) is formed in step (c) into paperboard having:
  a MD bending stiffness no greater than a third curve defined by the equation:

$$y^1 = 0.7949 x^{2.2095}; \text{ and}$$

a CD bending stiffness no greater than a fourth curve defined by the equation:

$$y^2 = 0.3282 x^{2.2095}.$$

29. The method of claim 16, wherein the paperboard web of step (b) is formed in step (c) into paperboard having a Parker Print Smoothness value of about 3 or less.

30. The method of claim 29, wherein the paperboard web of step (b) is formed in step (c) into paperboard having a Parker Print Smoothness value of about 2 or less.

31. The method of claim 30, wherein the paperboard web of step (b) is formed in step (c) into paperboard having a Parker Print Smoothness value of from about 1 to about 1.5.

* * * * *